(12) United States Patent
Yahara

(10) Patent No.: US 6,611,917 B1
(45) Date of Patent: Aug. 26, 2003

(54) GAME MACHINE HAVING A HIGH-POWER AND LOW-POWER BATTERIES BOTH SUPPLYING POWER TO DRIVE AND CONTROL CIRCUITS WITH POWER MANAGEMENT TO CONSERVE THE LOW-POWER BATTERIES

(75) Inventor: Toshiya Yahara, Suita (JP)

(73) Assignee: Playmore Corporation, Osaka (JP)

( * ) Notice: Subject to any disclaimer, the term of this patent is extended or adjusted under 35 U.S.C. 154(b) by 0 days.

(21) Appl. No.: 09/427,125

(22) Filed: Oct. 22, 1999

(51) Int. Cl.[7] .............. G06F 1/26; G06F 1/32; G06F 1/28; G06F 1/30
(52) U.S. Cl. ............. 713/320; 713/340; 713/324; 713/330
(58) Field of Search ............... 713/300, 320, 713/323, 330, 324, 340

(56) References Cited

U.S. PATENT DOCUMENTS

| | | | | |
|---|---|---|---|---|
| 5,041,914 A | * | 8/1991 | Ban | 347/226 |
| 5,343,461 A | * | 8/1994 | Barton et al. | 714/712 |
| 5,424,547 A | * | 6/1995 | Stark et al. | 250/372 |
| 5,739,596 A | * | 4/1998 | Takizawa et al. | 700/297 |
| 6,333,625 B1 | * | 12/2001 | Linder | 320/132 |
| 6,384,551 B1 | * | 5/2002 | Watanabe | 136/293 |

FOREIGN PATENT DOCUMENTS

JP       11283677 A    * 10/1999  .......... H01M/10/42

OTHER PUBLICATIONS

Gruenstern, R.; Reher, M.; Gerner, S.; Shaffer, D.; "Improved systems reliability through improved battery monitoring techniques",Telecom. Energy Conf., 1993. Intelec '93. 15th International, vol.: 1, Sep. 27–30, 1993, pp.: 63–66 vol.*

* cited by examiner

Primary Examiner—Thomas Lee
Assistant Examiner—James K. Trujillo

(57) ABSTRACT

A portable game machine having a high-power, short-life first power supply, and having a low-power long-life second power supply, each being configured for activating a game drive circuit that activates a game, and a game control circuit for issuing a control signal for activating the game. An on/off power switch connects the first power supply to the game drive circuit. A power management system controls power supply channels from the first and second power supplies. The power management system performing a plurality of functions, including supplying power to the game drive circuit and the game control circuit from the first power supply when the first power supply has sufficient power, and supplementally supplying power from the second power supply. The power management system may also control power supplied to the game control circuit and the game drive circuit based upon power levels in the first and second power supply.

12 Claims, 11 Drawing Sheets

[FIG. 1]
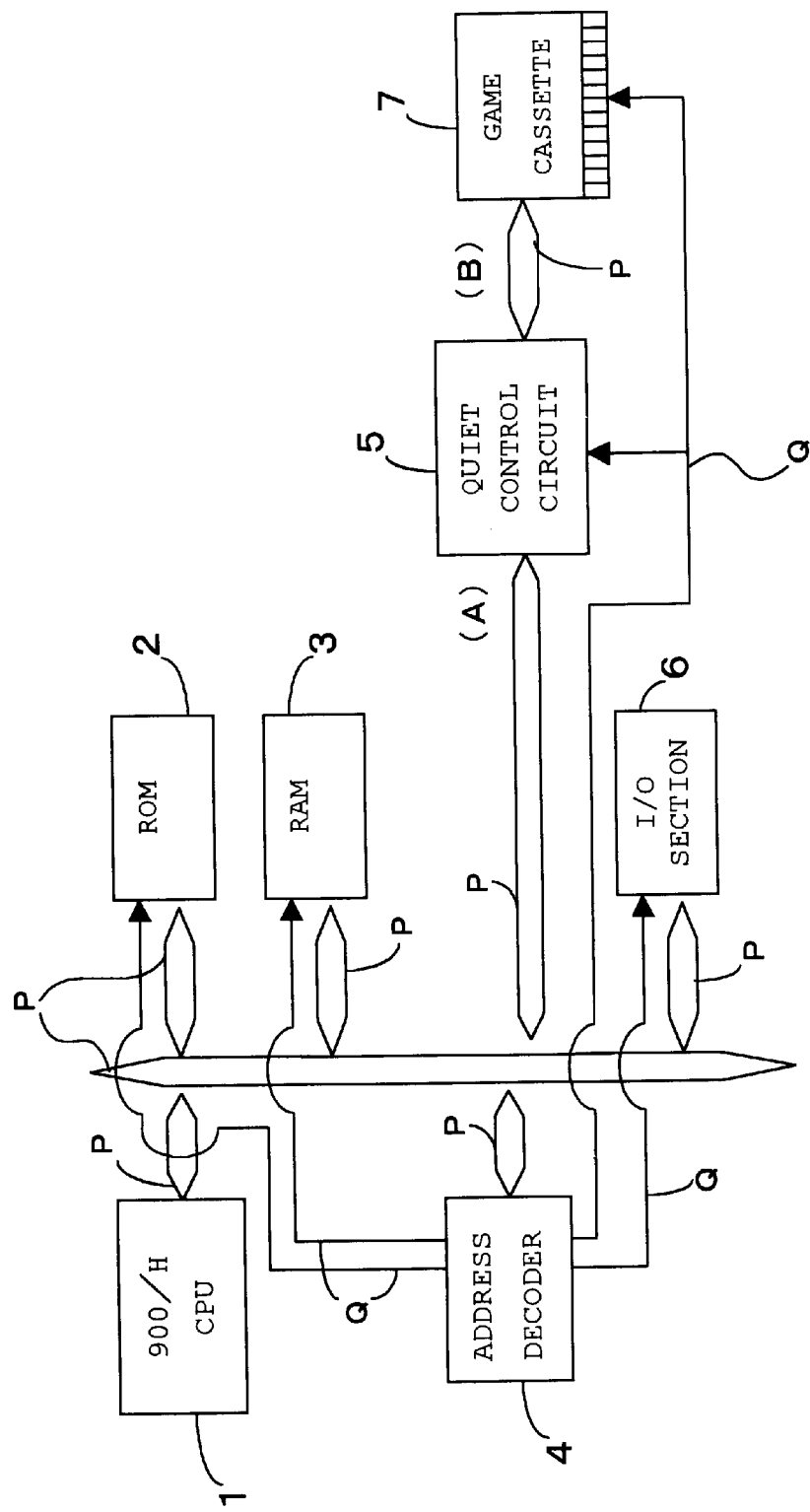

[FIG. 2]
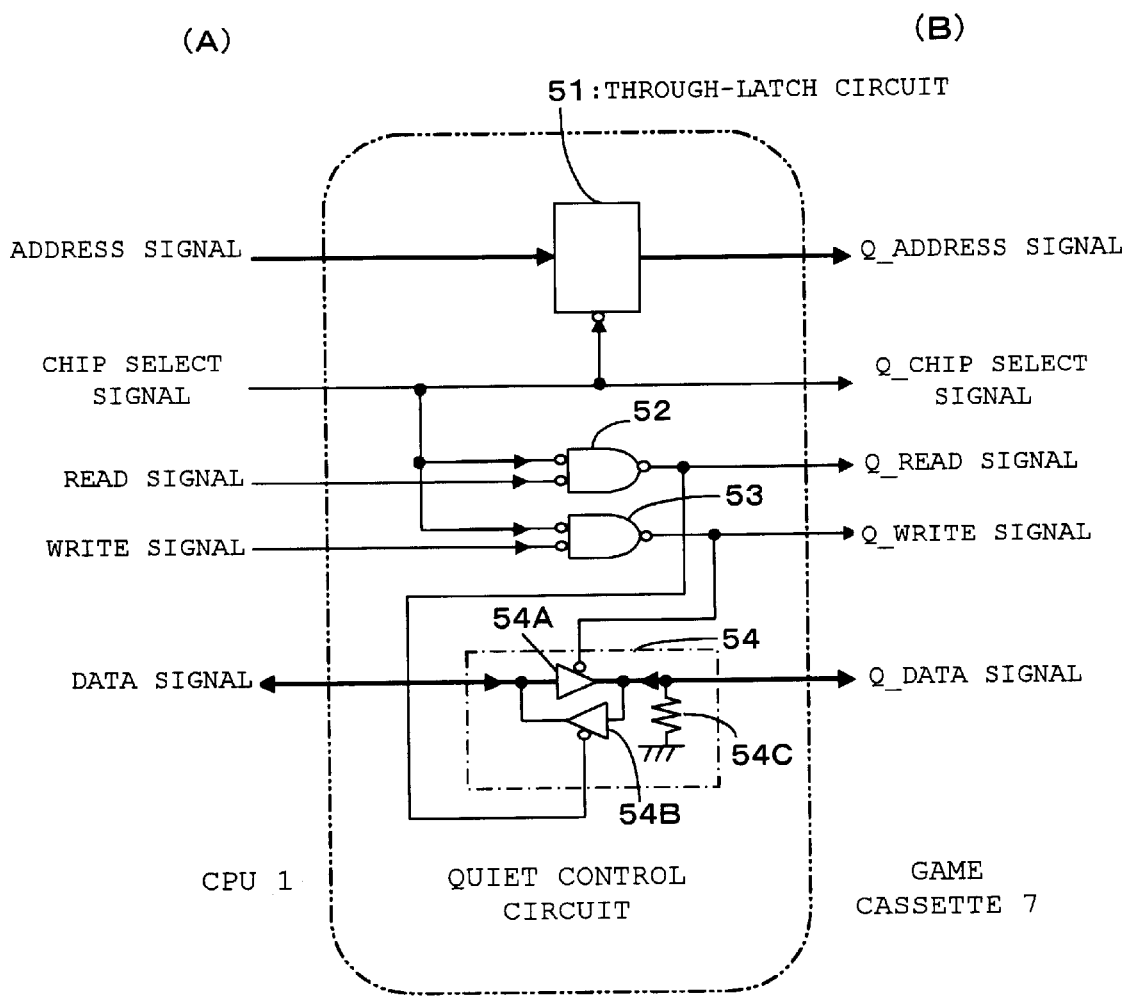

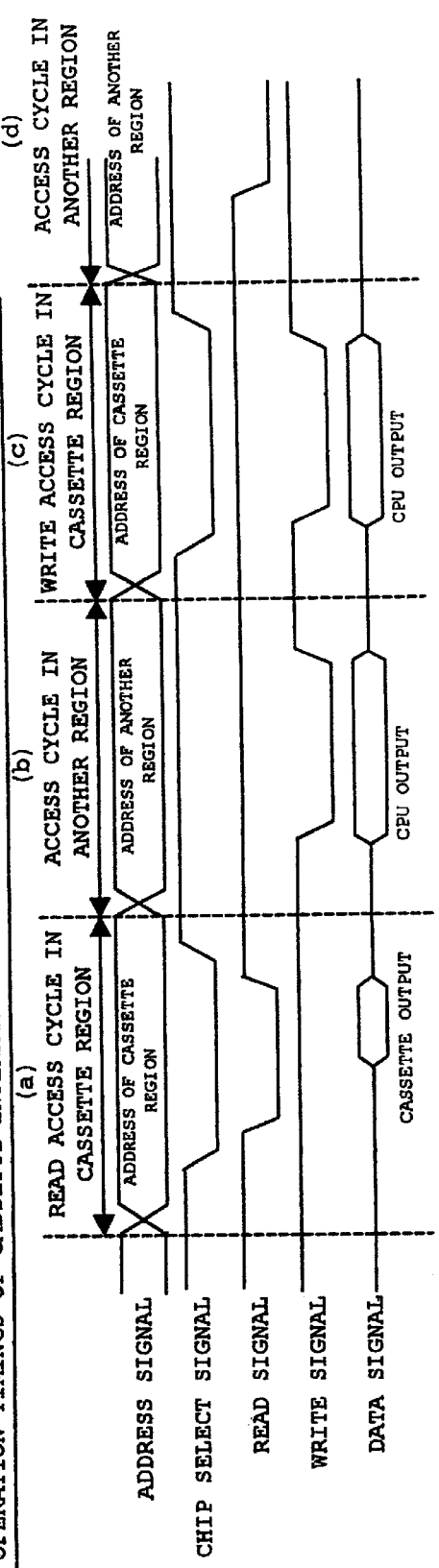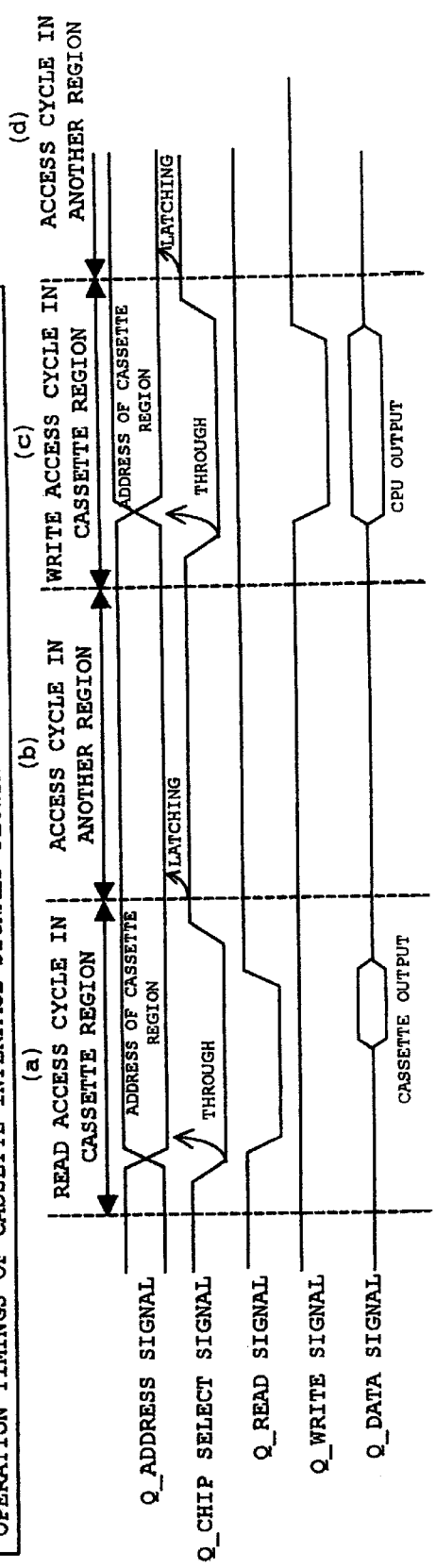

[FIG. 4]
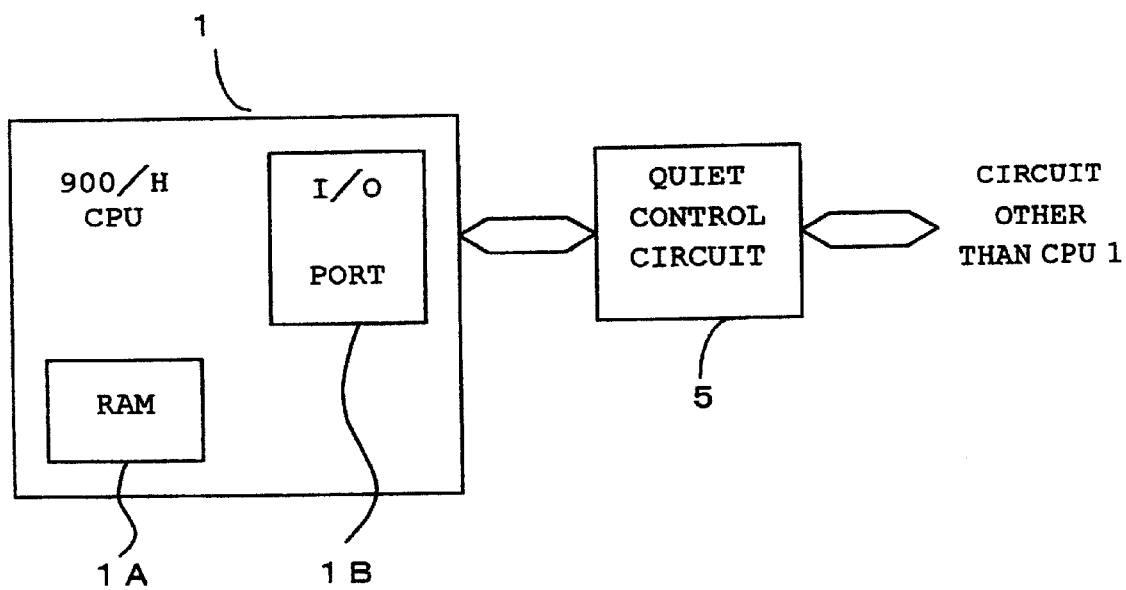

[FIG. 5]
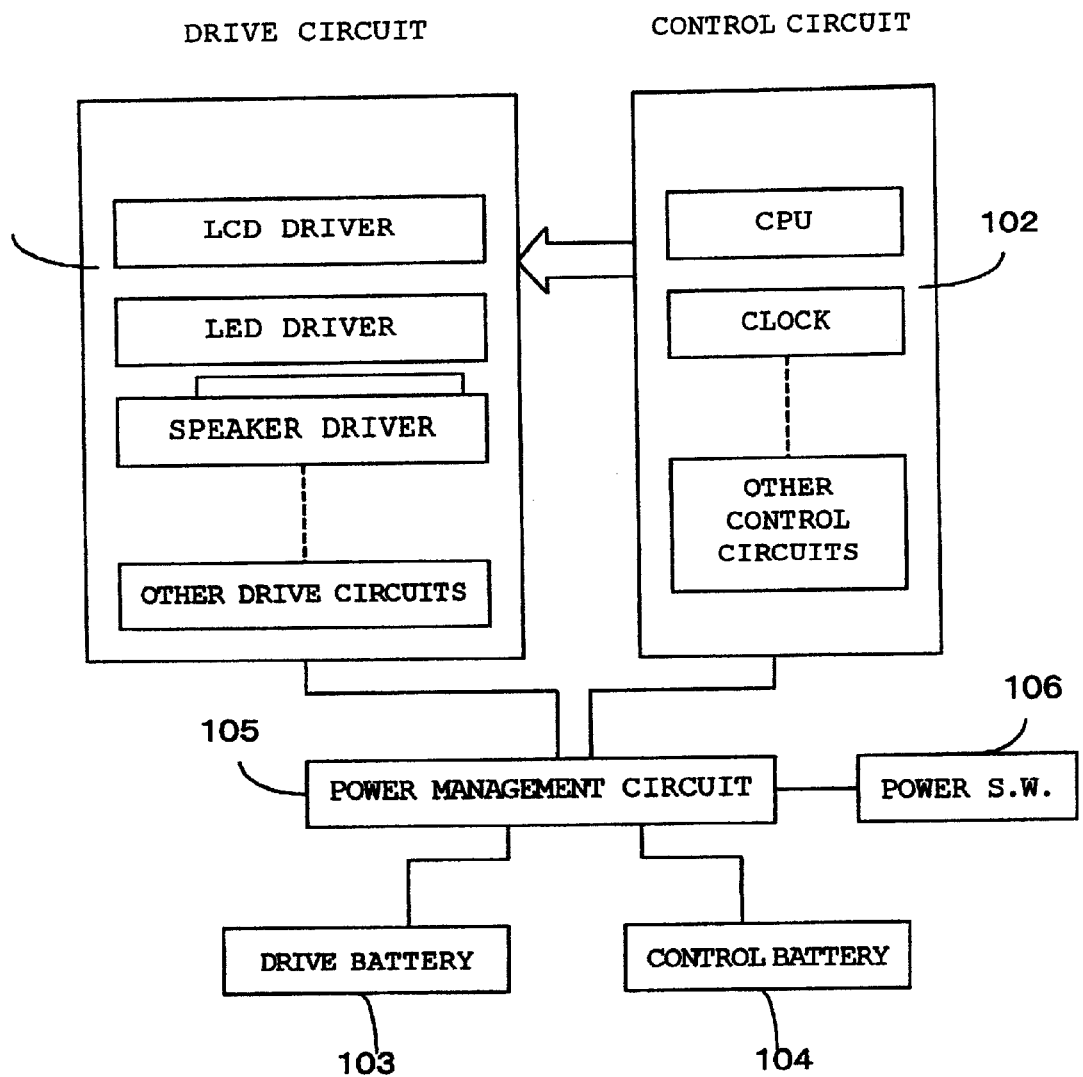

[FIG. 6]
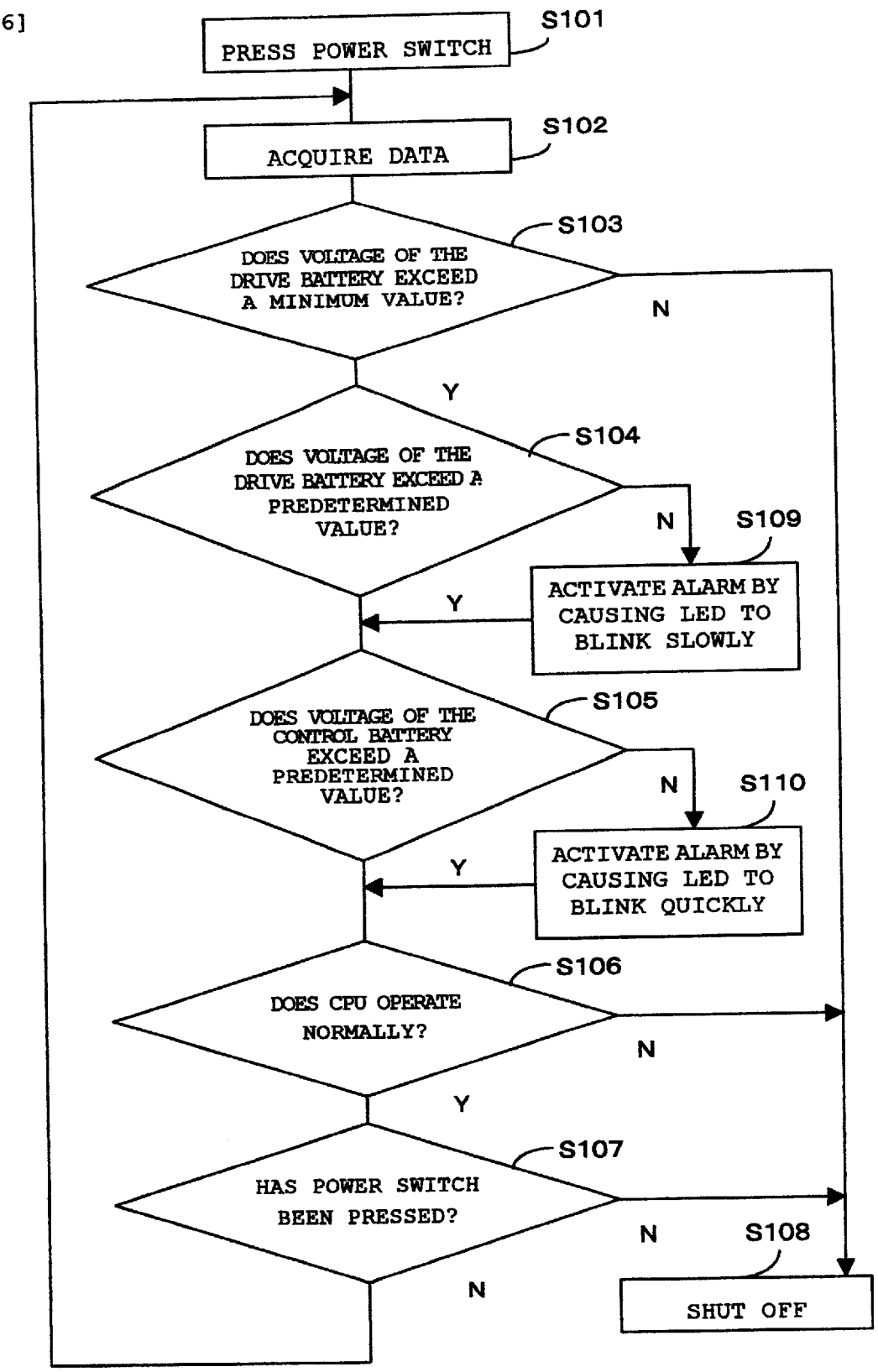

[FIG. 7(A)]
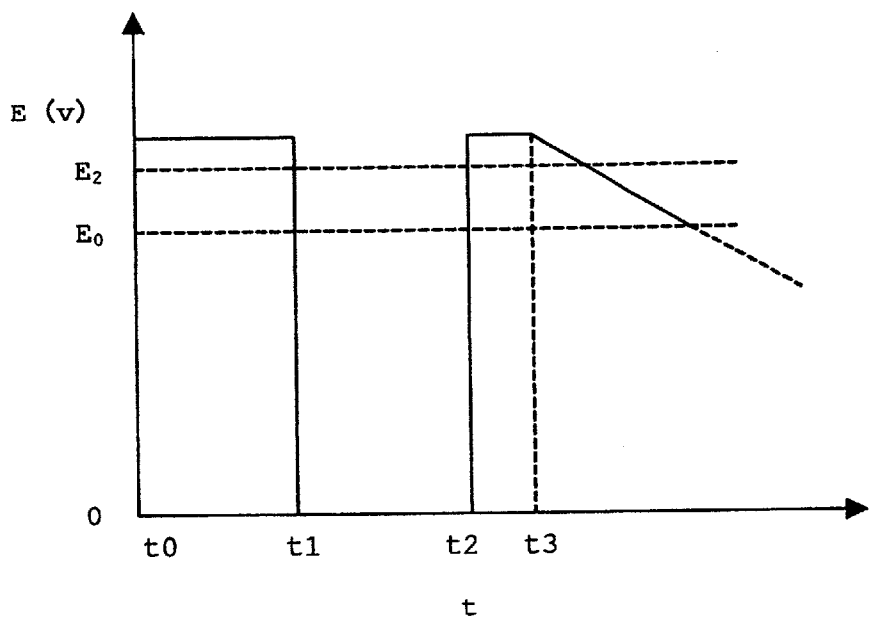
[FIG. 7(B)]
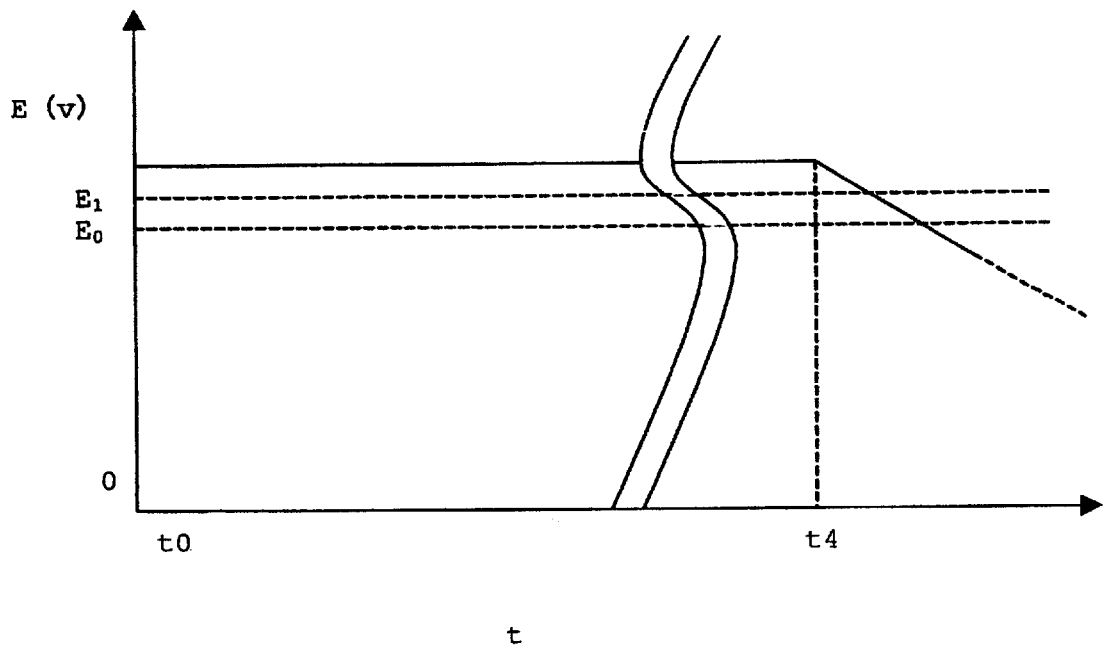

[FIG. 8]
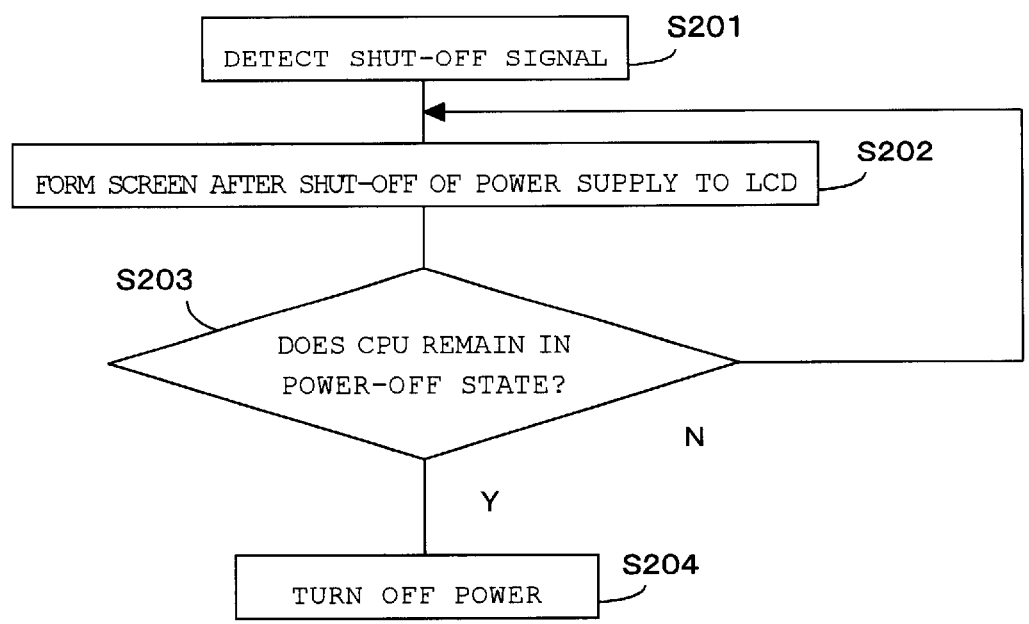

[FIG. 9]
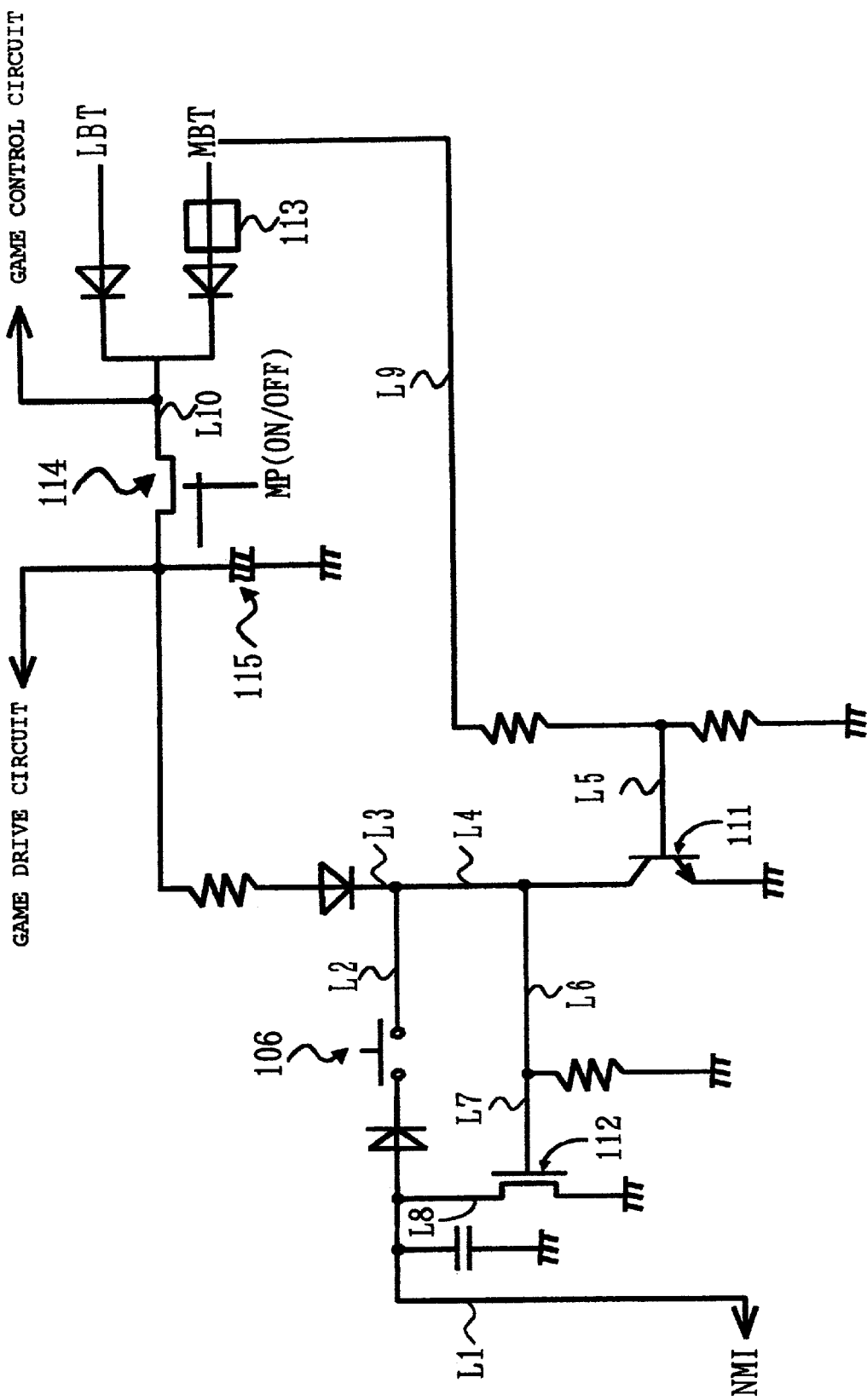

[FIG. 10]
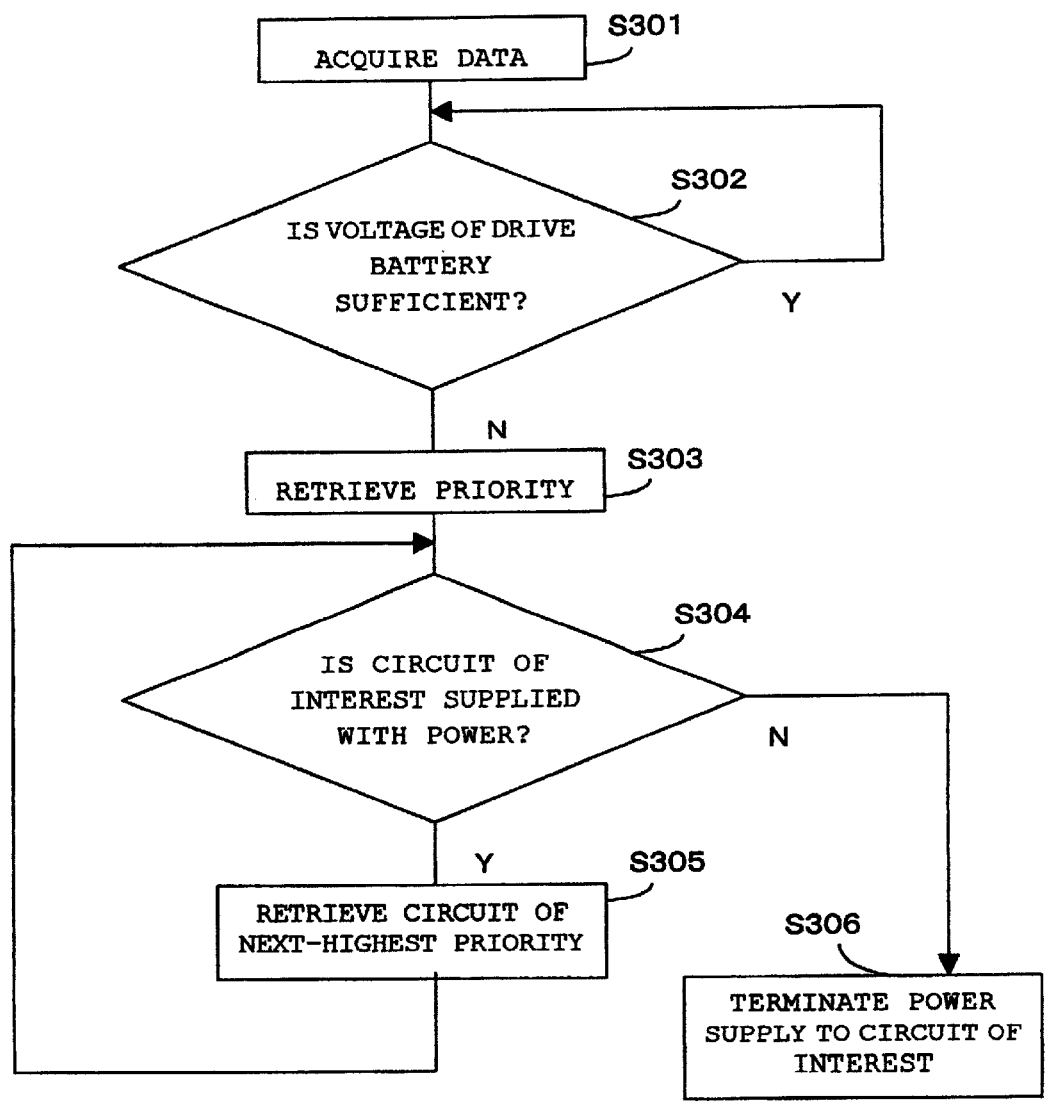

[FIG. 11]
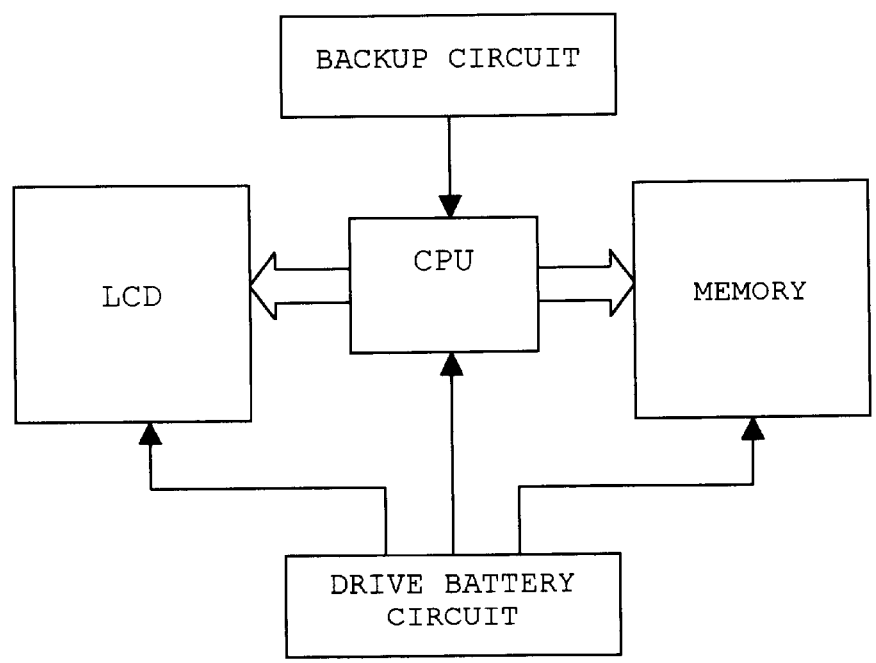
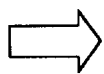  DIRECTION OF FLOW OF INSTRUCTION
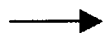  DIRECTION OF POWER SUPPLY

GAME MACHINE HAVING A HIGH-POWER AND LOW-POWER BATTERIES BOTH SUPPLYING POWER TO DRIVE AND CONTROL CIRCUITS WITH POWER MANAGEMENT TO CONSERVE THE LOW-POWER BATTERIES

BACKGROUND OF THE INVENTION

1. Field of the Invention

The present invention relates to a technique for saving the battery of, for example, a game machine for home use, as well as to a portable game machine.

More particularly, the present invention relates to a portable game machine having a function of monitoring and managing power consumption of a battery in order to diminish the frequency of replacement of the battery.

2. Related Art

In a game machine, memory (ROM or RAM) incorporated in the game machine or memory (cassette ROM) provided within a game cassette is accessed in accordance with the execution progress of a game, thereby reading data from or writing data into the memory.

At the time of access to memory, an address specified by an address signal is accessed. In order to enable access to a desired address, an address signal is switched at each access timing. In a common game machine, an address signal is switched in internal memory in completely the same manner as in external memory.

Data are written or read in response to a write or read signal. In a common game machine, a read signal and a write signal are input to internal memory in completely the same manner as for external memory.

Switching of an address signal involves consumption of a battery. If an address signal is switched in external memory even at the time of access to internal memory, which would originally be accessed independently, battery power is wasted.

If a write signal is input not only to internal memory but also to external memory at the time of data being written into the internal memory (in a case where an address signal represents an address of internal memory), data to be written into the internal memory would be transmitted to the external memory, thereby resulting in a problem of generation of unwanted data (garbage).

Most current portable game machines are activated by dry cells, such as alkaline dry cells or manganese dry cells. Power is supplied to the game machine from the dry cells while the player is playing a game. When the player terminates the play of the game, power supplied from the cells is stopped.

In a portable game machine, ability to resume a game is secured. Even when a game is temporarily suspended and the power of the game machine is turned off, the game can be resumed from where the player had left off.

In order to ensure such an ability to continue a game, a voltage is continuously applied to a CPU or memory of the portable game machine at all times. To this end, in addition to having a drive battery used when the player plays a game, such as alkaline dry cells or manganese dry cells, the game machine is further equipped with a dedicated battery, such as a coin-type battery.

Most current and widely-accepted portable game machines are equipped with a function other than a game, such as a clock function. The reason why such an additional function, like a clock function, remains properly activated even while the power of the game machine is turned off is that the function is appropriately controlled by means of the dedicated battery, such as a coin-type battery, even when the power of the game machine is turned off.

As mentioned above, the current portable game machine has a drive battery for providing high power for activating a liquid crystal display device or a speaker during the play of a game, and a control battery for providing lower power for the CPU or the additional function while the game machine remains deactivated. Manganese dry cells or alkaline dry cells are employed as a typical drive battery, and a coin-type battery, such as a mercury battery or a lithium battery, is employed as a typical control battery.

Under such circumstances, the battery poses a problem in terms of its life. A voltage is continuously applied to the CPU and memory of the portable game machine in order to ensure the ability to continue a game, and power is continuously applied in order to control the additional function, such as a clock function. As a result, the battery becomes depleted more and more, so that the battery must be replaced frequently.

However, replacement of a battery, particularly a coin-type battery, involves troublesome labor. Further, the coin-type battery is more expensive than manganese or alkaline dry cells. Therefore, the number of times a battery is to be replaced is desirably minimized.

In contrast, if the player has great concern about only power saving and has continuously used a battery which is incapable of supplying a voltage sufficient for controlling the game machine, a difficulty is encountered in reliably supplying an appropriate amount of power at an appropriate voltage, so that the player may encounter a serious trouble problem such a loss of scores which have been achieved thus far.

SUMMARY OF THE INVENTION

The present invention has been conceived in view of the problem, and the foregoing object of the present invention is to provide a game machine capable of saving power of a battery thereof by elimination of unwanted switching between address signals, as well as to provide an access control method for use with the game machine.

To this end, the present invention provides a technique related to a game machine which exchanges (sends/receives) data with the outside in accordance with the execution progress of a game. The technique is characterized in that the an address signal is switched only at the time of access to the outside, thereby outputting a read signal or a write signal. In general, a request for access to external memory is made less frequently than is a request for access to internal memory. Therefore, if the present invention is applied to such a game machine, a highly advantageous effect is considered to be yielded.

More specifically, the following inventions are provided:
(A) A game machine which sends/receives data according to the execution progress of a game, comprising:
an access control circuit which controls access made by a the control circuit.
(B) The game machine as defined in (A), wherein the access control circuit varies a control signal by changing the access signal when the control circuit makes access to another circuit; i.e., a circuit other than the control circuit.

(C) A game machine which sends/receives data according to the execution progress of a game, comprising:
an access control circuit including
a latch circuit which latches an access signal, changes the access signal and outputs the thus-changed access signal when the control circuit accesses another circuit; i.e., a circuit other than the control circuit, and holds the access signal and outputs the thus-held access signal in a case other than the case where the control circuit accesses another circuit; and
a control signal output circuit which outputs a desired control signal when the control circuit accesses another circuit; i.e., a circuit other than the control circuit.

(D) An access control method for use with a game machine which sends/receives data according to the execution progress of a game, the method comprising a step of:
varying an access signal by changing a control signal only when a control circuit accesses another circuit; i.e., a circuit other than the control circuit.

In the game machine of the present invention as described in (A) through (D), a control signal is changed by means of switching an access signal at the time of a control circuit accessing another circuit; i.e., a circuit other than the control circuit. Accordingly, needless switching between access signals is eliminated, thus saving power of the battery of the game machine and preventing generation of garbage, to thereby effect efficient processing.

Since there can be diminished the number of times switching between address signals is effected, the present invention yields an advantage of the ability to diminish undesired radiation of electromagnetic radio waves or noise.

Definition of Terms
<Device>
A term "game machine" signifies a game machine for home use or a portable game machine.

Throughout the specification, a term "access control circuit" signifies a circuit "which controls access which a control circuit makes with respect to another circuit; i.e., a circuit other than the control circuit, and temporarily retains an access signal output from the control circuit." Accordingly, the access control circuit is not limited to a circuit having a configuration such as that described in the section entitled "Modes for Carrying Out the Invention." Any circuit maybe employed as the access control circuit, so long as the circuit has a function identical with that set forth.
<Access Control Circuit>
A term "control circuit" signifies a computing circuit. A term "another circuit; i.e., a circuit other than a control circuit" signifies a circuit, an element, or a like member which is to be incorporated in a game machine, such as ROM or RAM to be incorporated in the game machine, as well as a circuit, an element, and a like member which is to be handled separately from a main unit of the game machine, such as cassette ROM incorporated in a game cassette.

A term "access signal" signifies a signal (for example, an address signal) for instructing the control circuit to make an access, and a term "control signal" signifies a signal for controlling functions of the game machine (for example, a read signal, a write signal, or a chip select signal).

An expression "switching between access signals" signifies that an access signal, which has been previously input to the access control circuit, is switched to another newly-input access signal. An expression "latching of an access signal" signifies that an access signal, which has been previously input to the access control circuit, is latched, in its present form, even when another access signal is newly input to the access control circuit.

An expression "changing of a control signal" signifies a change in the output status of a control signal; for example, from a low state; to a high state or vice versa.

The present invention has been conceived to solve the previously-described problem, and the object of the present invention is to provide a battery power monitoring and management system capable of diminishing the number of times a battery is to be replaced while ensuring reliable supply of.an appropriate amount of power at a suitable voltage to a portable game machine having a drive battery, such as a manganese cell or an alkaline cell, and a control battery, such as a coin-type battery.

To achieve the foregoing object, in the present invention, a drive battery and a control battery in principle provide compensation for each other. Therefore, in the event of occurrence of anomalous conditions or depletion of power, prevention of depletion of the control battery is prioritized, thereby saving the power of the control battery.

Simultaneously, in the present invention, a control battery whose power supply is appropriately saved is used for performing other useful control operations.

More specifically, the present invention provides the following inventions.

First, a portable game machine of the present invention
(E) A portable game machine comprising:
a game drive circuit for activating a game;
a game control circuit for issuing a control signal for activating a game;
a high-power short-life first power supply serving as a battery for activating the game drive circuit and the game control circuit; and
a low-power long-life second power supply serving as a battery for activating the game drive circuit and the game control circuit;
the portable game machine further comprising:
a power switch for turning on or off power supply to the game drive circuit from the first power supply; and
a power management system for controlling a power supply channel from the first power supply and a power supply channel from the second power supply, the power management system having, the function of performing control operation (i) indispensably and at least one control operation selected from the group consisting of (ii), (iii), (iv), and (v):
(i) an operation for, in principle, supplying power to the game drive circuit from the first power supply, as well as for supplying power: to the game control circuit from the first power supply when the first power supply has sufficient power supply ability and supplementally supplying power from the second power supply;
(ii) an operation for supplying power to the game control circuit from the first power supply, when it is detected that the power supply capability of the second power supply has dropped to a predetermined level or lower;
(iii) an operation for preventing power supply to the game control circuit from the second power supply even though the power switch is turned on, when it is detected that the power supply capability of the first power supply has dropped to a predetermined level or lower;

(iv) an operation for preventing power supply to the game drive circuit from the first power supply without involvement of power supply to the game control circuit from the second power supply when it is detected that the power supply capability of the first power supply has dropped to a predetermined level or lower, as well as for preventing power supply to the game control circuit from.the second power supply even though the power switch is turned on; and (v) an operation for supplying power supply to the game drive circuit from the first power supply when runaway of a control circuit provided within circuitry is detected.

A term "first power supply" corresponds to the drive battery, and a term "second power; supply" corresponds to the control battery. By means of such a configuration, when the control battery becomes depleted, power is supplied from the drive battery to a game control circuit. The status of a game, as has been accumulated thus far, such as a stage, an empirical value, and a score, is reserved unless the player removes the first and second power supplies simultaneously [this can be prevented by forming a section for storing a coin-type battery (i.e., the second power supply) so as to make removal of the coin-type battery (the second power supply) difficult (through use of, for example, a simple cover which cannot be removed manually without use of a tool of some kind)].

In contrast, in the event of depletion of the drive battery, no power is supplied to the drive battery from the control battery, thereby preventing depletion of the control battery and conserving ability to supply power to the control battery.

In the event that the drive battery (dry cells, such as manganese dry cells or alkaline dry cells) are abruptly removed from the game machine, power will not be supplied to the drive circuit from the control battery. Accordingly, depletion of the control battery is prevented, and the ability of the control battery to supply power is conserved.

Next, the second characteristic of the portable game machine of the present invention resides in comprising the following elements solely or in combination:

(F) The portable game machine as defined in (E), further comprising the following device or functions solely or in combination:
  (i) a battery depletion indicator which indicates a drop in, the power supply capability of the first power supply and/or a drop in the power supply capability of the second power supply and whose indication differs according to whether a drop in the power supply capability of the first power supply is indicated or a drop in the power supply capability of the second power supply is indicated;
  (ii) a clear-off function of shutting off power supply to a game drive circuit from the first power supply after formation of a screen appearing after shut-off of power; and
  (iii) a shut-off function for shutting off a control mechanism pertaining to control of the game control circuit with reference to the processing required until the game has reached a good point in time for leaving off, in terms of game control.

By virtue of the first and second characteristics of the present invention, in the event that operation of a CPU has become anomalous as a result of abrupt removal of, for example, a memory cassette having a game program stored therein, power supply from the drive battery is shut off. Subsequently, after the game has reached a good point in time for leaving off, a game-control-related mechanism of the control circuit is turned off, thereby preventing depletion of the drive and control batteries, which would otherwise be caused when operation of the CPU has become anomalous.

Further, the present invention also provides a portable game machine which employs the following elements solely or in combination.

(G) A portable game machine comprising:
  a game drive circuit for activating a game;
  a game control circuit for issuing a control signal for activating a game;
  a high-power short-life first power supply serving as a battery for activating the game drive circuit and the game control circuit; and
  a low-power long-life second power supply serving as a battery for activating the game drive circuit and the game control circuit, the portable game machine comprising the following device or functions solely or in combination:
    (i) a battery depletion indicator which indicates a drop in the power supply capability of the first power supply and/or a drop in the power supply capability of the second power supply and whose indication differs according to whether a drop in the power supply capability of the first power supply is indicated or a drop in the power supply capability of the second power supply is indicated;
    (ii) a clear-off function of shutting off power supply to a game drive circuit from the first power supply after formation of a screen appearing after shut-off of power; and
    (iii) an automatic shut-off function for shutting off a control mechanism pertaining to control of the game control circuit after power supply to the game drive circuit from the first power supply has been cut off, with reference to the processing required until the game has reached a good point in time for leaving off, in terms of game control.

In a portable game machine of the present invention having the previously-described second characteristic, a battery-depletion indicator preferably provides an indication by means of blinking of a lamp. In this case, the speed at which the battery-depletion indicator blinks differs according to whether the power supply capability of the first power supply is degraded or the power supply capability of the second power supply is degraded. In the event of a battery being depleted, the player can readily ascertain whether the first battery or the second battery is depleted.

In the portable game machine of the present invention, "formation of a screen after shutoff of power supply" is effected when power supply to a game drive circuit from the first power supply is shut off. In a case where a liquid crystal display screen is adopted as a game screen, power supply to the game screen drive circuit is shut off after the entire game screen has been made white in the case of the liquid crystal display screen being of normally white type or after the entire game screen has been made black in the case of the liquid crystal display screen being of normally black type. As a result, there can be prevented a transient phenomenon, such as screen flickers, which would otherwise be caused when the liquid crystal drive circuit is abruptly turned off, thereby preventing a screen from disappearing unfavorably.

A power management system of the present invention will be conceptually expressed as follows:

(H) A method of controlling a power supply channel within a game machine, in which
in a case where two or more power supply channels are present, a power supply channel relating to a control circuit is prioritized over a power supply channel relating to a drive circuit, and in the event of occurrence of a shortage in supply power in either of the power supply channels, power supply to the power supply channel relating to the control circuit is maintained to the end.

A CPU is very vulnerable to fluctuations in voltage. If a voltage within a range between activation and deactivation is applied to the CPU, the CPU forms an erroneous determination as to whether to be activated or to be deactivated, thereby causing faulty operations. The portable game machine equipped with the power management system of the present invention diminishes depletion of the control battery (the second power supply) to as little as possible, thus minimizing the chance of application to the CPU of such a misleading voltage (within the range between activation of a CPU or deactivation of a CPU).

In the portable game machine equipped with the power management system of the present invention, in the event that the control battery (the second power supply) becomes depleted and the voltage supplied from the control battery has dropped to such a voltage (i.e., a voltage within the range between activation of a CPU and deactivation of a CPU), the player is unfailingly informed of battery depletion and is prompted to replace the control battery.

Further, in the game machine equipped with the power management system of the present invention, in the event of certain occurrence, such as abrupt removal of dry cells during the play of a game or abrupt removal of a memory cassette having a game program stored therein, the game machine is prevented from being broken, thereby conserving game results which have been achieved thus far (the status of a game; for example, a stage, an empirical value, history, and a score, all having been achieved by the player through his great efforts).

Moreover, effective saving of battery power contributes to safeguarding of the environment, as well as to energy conservation.

In another aspect of the present invention, there is provided a portable game machine as provided below.

(I) A portable game machine comprising:
a game drive circuit for activating a game;
a game control circuit for issuing a control signal for activating a game;
a high-power short-life first power supply serving as a battery for activating the game drive circuit and the game control circuit;
a low-power long-life second power supply serving as a battery for activating the game drive circuit and the game control circuit; and
a power management system for controlling a power supply channel from the first power supply and a power supply channel from the second power supply, in which
when it is detected that the power supply capability of the first power supply is lower than a predetermined level, the power management system shuts off power supply in ascending sequence of priority from a low priority level in accordance with pre-set priority levels.

With regard to a term "priority," circuits, which are selected from primarily a drive circuit, are prioritized arbitrarily. Priority assigned to circuits is determined, as required, in comprehensive consideration of the power dissipation of a circuit of interest.

The following recording medium can also be used in fulfilling the present invention.

(J) A computer-readable storage medium on which there is stored a program for performing control operation (i) indispensably and at least one control operation selected from the group consisting of (ii), (iii), (iv), and (v):
(i) an operation for, in principle, supplying power to the game drive circuit from the first power supply, as well as for supplying power to the game control circuit from the first power supply when the first power supply has sufficient power supply ability and supplementally supplying power from the second power supply;
(ii) an operation for supplying power to the game control circuit from the first power supply, when it is detected that the power supply capability of the second power supply has dropped to a predetermined level or lower;
(iii) an operation for preventing power supply to the game control circuit from the second power supply even though the power switch is turned on, when it is detected that the power supply capability of the first power supply has dropped to a predetermined level or lower;
(iv) an operation for preventing power supply to the game drive circuit from the first power supply without involvement of power supply to the game control circuit from the second power supply when it is detected that the power supply capability of the first power; supply has dropped to a predetermined level or lower, as well as for preventing power supply to the game control circuit from the second power supply even though the power switch is turned on; and
(v) an operation for supplying power supply to the game drive circuit from the first power supply when runaway of a control circuit provided within circuitry is detected.

(K) The computer-readable storage medium as defined in (J), wherein there is stored a program for selectively fulfilling processing relating to each of the following device or functions:
(i) a battery depletion indicator which indicates a drop in the power supply capability of the first power supply and/or a drop in the power supply capability of the second power supply and whose indication differs according to whether a drop in the power supply capability of the first power supply is indicated or a drop in the power supply capability of the second power supply is indicated;
(ii) a clear-off function of shutting off power supply to a game drive circuit from the first power supply after formation of a screen appearing after shut-off of power; and
(iii) a shut-off function for shutting off a control mechanism pertaining to control of the game control circuit with reference to the processing required until the game has reached a good point in time for leaving off, in terms of game control.

Such a program enables provision of a portable game machine which, partially shuts off power supply according to a decrease in the power supply capability (for instance, depletion of a battery) of a portable power source (basically corresponding to a battery)

The power management system of the present invention will be described as follows from another viewpoint.

(L) A game machine comprising:
a display (LCD) for rendering a game image;
game program memory (memory) for storing a game program; a controller (CPU) for controlling individual functions of the game machine; and
two power circuits including a drive power circuit and a back-up power circuit (see FIG. 11).

In the power management system of the present invention the drive power circuit supplying power to the display, the game program memory, and a CPU; and the back-up power circuit supplying power to the CPU.

The power management system of the present invention can be embodied by means of, for example, the following circuit configuration (the circuit configuration will be described in detail later).

(M) A portable game machine including:
a game drive circuit for activating a game;
a game control circuit for issuing a control signal for activating a game;
a high-power short-life first power supply serving as a battery for activating the game drive circuit and the game control circuit; and
a low-power long-life second power supply serving as a battery for activating the game drive circuit and the game control circuit, the game control circuit being connected to the first and second power-supplies, the-game machine further comprising:
a capacitor which is recharged by the first power supply;
a comparator circuit which determines a difference between an output from the capacitor and an output from the first power supply and is activated when the difference has exceeded a predetermined value; and
a switch circuit which turns on or off power supply to the game drive circuit from the first and second power supplies and shuts off the power supply to the game drive circuit from the first and second power supplies when the comparator circuit is turned on.

(N) A portable game machine including:
a game control circuit for issuing a control signal for activating a game;
a high-power short-life first power supply serving as a battery for activating the game drive circuit and the game control circuit; and
a low-power long-life second power supply serving as a battery for activating the game drive circuit and the game control circuit, the game control circuit being connected to the first and second power supplies, the game machine further comprising:
a comparator circuit which determines a difference between an output from the first power supply and an output from the second power supply and is activated when the difference has exceeded a predetermined value; and
a switch circuit which turns on or off power supply to the game drive circuit from the first and second power supplies and shuts off the power supply to the game drive circuit from the first and second power supplies when the comparator circuit is turned on.

The portable game machine of the present invention, which has been described above, is equipped with a drive battery and a control battery. An appropriate amount of power is ensured at a suitable voltage, and the frequency of replacement of dry cells can be diminished

BRIEF DESCRIPTION OF THE DRAWINGS

FIG. 1 is a block diagram showing the configuration of a game machine equipped with a quiet control circuit, which circuit serves as an access control circuit, of the present invention;

FIG. 2 is a schematic diagram showing the configuration of the quiet circuit;

FIG. 3(A) and FIG. 3(B) are timing charts for describing the operation of a game machine equipped with a quiet control circuit, which circuit serves as the access control circuit of the present invention;

FIG. 4 is a block diagram showing another example of a game machine equipped with the quiet control circuit, which circuit serves as the access circuit of the present invention;

FIG. 5 is a block diagram showing the functional configuration of a portable game machine equipped with a power management system of the present invention;

FIG. 6 is operation flowchart showing the overall flow of operation of the management system of the present invention;

FIG. 7 is an illustration showing the electrical characteristics of dry cells; particularly, FIG. 7(A) schematically shows time-varying changes in a start-up voltage of a drive battery 103 (for instance, an alkaline dry cell), and FIG. 7(B) schematically shows time-varying charges in a start-up voltage of a control battery 104 (for instance, a lithium battery);

FIG. 8 is an operation flowchart showing the flow of operation of the portable game machine when the power management system of the present invention is shut off;

FIG. 9 is a circuit diagram showing one example of specific; configuration of a power management circuit;

FIG. 10 is an operation flowchart showing one example of operation flow of a portable game machine which partially shuts off power supply in accordance with a reduction in the power supply capability of a port rebattery; and FIG. 11 is a block diagram for describing the power management system of the present invention from another viewpoint.

MODES FOR CARRYING OUT THE INVENTION

Embodiments of the present invention will be described hereinbelow by reference to the drawings.

(a) Description of a First Embodiment
[Hardware Configuration].

FIG. 1 is a block diagram showing the configuration of a game machine equipped with a quiet control circuit, which circuit serves as an access control circuit of the present invention. The game machine is a portable game machine for personal use at home. As shown in FIG. 1, the game machine comprises a 900/H CPU (Central Processing Unit) 1; ROM (Random Access Memory) 2; RAM (Random Access Memory) 3; an address decoder 4; a quiet control circuit 5; and an I/O (;Input-Output) section 6. In FIG. 1, reference numeral 7 designates a game cassette; symbol P designates a data bus; and symbol Q designates a signal line for use with a chip-select signal (an address signal line, a read signal line, and a write signal line are omitted from FIG. 1).

The CPU 1 controls individual sections within the game machine, performs various types of computing operations, and corresponds too a term "control circuit" appearing in the appended claims.

The ROM 2 reserves a program to be used for activating the game machine or a like element. The RAM 3 temporarily reserves a program read from the game cassette 7 or a like element and corresponds to a term "circuit other than a control circuit" appearing in the appended claims.

The address decoder 4 monitors an address space within the game machine and outputs a chip select signal corresponding to an address signal output from the CPU 1.

The quiet control circuit 5 corresponds to a term "access control circuit" appearing in the claims. As shown in FIG. 2, the quiet control circuit 5 comprises a through-latch circuit 51, AND circuits 52 and 53, and a bi-directional buffer section 54 for use with a data signal.

The through-latch circuit 51 corresponds to a term "latch circuit" appearing in the claims. The through-latch circuit 51 latches an address signal, switches the address signal to another signal when the CPU 1 accesses another circuit; that is, a circuit other than the CPU 1, and outputs the resultantly-selected signal, and holds and outputs the address signal when an internal circuit of the CPU 1 (e.g., internal RAM) is accessed.

More specifically, as shown in FIG. 2, the through-latch circuit 51 receives an address signal and a chip select signal as input signals. The thus-entered address signal is latched in the through-latch circuit 51. When the chip select signal is in a low state (implying that the game cassette 7 should be accessed); that is, when access to an external device is to be made, the address signal, which has previously been input to the through-latch circuit (i.e., an address signal for specifying access to internal memory), is replaced with a newly-input address signal (for specifying access to external memory). The newly-input address signal is then output to the game cassette 7. When the chip select signal is in a high state (implying that the ROM 2 or RAM 3 provided in the game machine should be accessed); that is, when access to an internal device of the game machine is to be made, the address signal, which has been previously input to the through-latch circuit (i.e., the address signal for specifying access to external memory) is latched, in its present form, even when another address signal (for specifying access to internal memory) is newly input to the through-latch circuit. The thus-latched address signal is output to the game cassette 7. A term "Q_address signal" shown in FIG. 2 signifies an address signal which has passed through the quiet control circuit 5.

The AND circuit 52 corresponds to a term "control signal output circuit" appearing in the appended claims and acts as a read signal AND circuit (a negative AND circuit is used for the AND circuit 52 in the embodiment) which outputs a read signal only when the CPU 1 accesses another circuit; that is, a circuit other than the CPU 1.

More specifically, as shown in FIG. 2, a chip select signal and a read signal are input to the AND circuit 52. When both the chip select signal and the,read signal are in a low state; that is, when read access to an external device should be made, the AND circuit 52 outputs a read signal to the game cassette 7 (in FIG. 2, a term "Q_read signal" signifies a read signal which has passed through the quiet control circuit 5). Further, when either or both of the chip select signal and the read signal are in a high state (i.e., read access to an external device is not specified), the AND circuit 52 does not output a read signal to the game cassette 7.

The AND circuit 53 corresponds to a terminal "control signal output circuit" and acts as a write signal AND circuit (in the embodiment a negative logic circuit is used as the AND circuit 53) which outputs a write signal only when the CPU 1 makes write access to another circuit; that is, a circuit other than the CPU 1.

More specifically, as shown in FIG. 2, the chip select signal and a write signal are input to the AND circuit 53. When both the chip select signal and the write signal are in a low state; that is, when write access to an external device is made, the AND circuit 53 outputs a write signal to the game cassette 7 (a term "Q_write signal" shown in FIG. 2 signifies a write signal which has passed through the quiet control circuit 5). Further, when either or both of the chip select signal and the write signal are in a high state (i.e., write access to an external device is not specified), the AND circuit 53 does not output a write signal to the game cassette 7.

The bi-directional buffer 54 permits flow of data (a data, signal) and comprises a write data buffer 54A for receiving the write signal. (Q_write signal), a read data buffer 54B for receiving the read signal (Q_read signal), and a resistor 54C. A term "Q_data signal" shown in FIG. 2 signifies a data signal which flows to a stage (i.e., the game cassette 7) subsequent to the quiet control circuit 5.

In FIG. 1 and FIG. 2, (A) designates signals flowing through a stage prior to the quiet control circuit 5, and (B) designates signals flowing to a stage subsequent to the quiet control circuit 5.

The I/O section 6 is shown so as to comprise a parallel port, a serial port, and a 2D circuit section.

The game cassette 7 is inserted into a cassette insert slot (not shown) and is electrically connected to the game machine of the present embodiment by way of the quiet control circuit 5.

[Operation]

The operation of the game machine equipped with the quiet control circuit, which circuit acts as an access control circuit of the present invention, will now be described by reference to FIG. 3(A) and FIG. 3(B). FIG. 3(A) is a timing chart showing operation timings of signals which flow through the stage (A) prior to the quiet control circuit 5, and FIG. 3(B) is a timing chart showing operation timings of signals which flow through the stage (B) subsequent to the quiet control circuit 5.

In the game machine shown in FIG. 1, the quiet control circuit 5 receives the address signal output from the CPU 1, the chip select signal output from the address decoder 4, and the read or write signal output from the CPU 1.

When the game cassette 7 is accessed (i.e., when access to an external device is made), the quiet control circuit 5 outputs a read signal or a write signal by switching an address signal to an other address signal. In contrast, when the ROM 2 or the RAM 3 provided in the game machine is accessed (when an internal device of the game machine is accessed), the quiet control circuit 5 latches the address signal and outputs a read or write signal.

Within the quiet control circuit 5, when an address signal and a chip select are input to the through-latch circuit 51, the through-latch circuit 51 latches the thus-entered address signal. In a case where the chip select signal is in a low state, the address signal, which has been previously input to the through-latch circuit 51, is switched to the newly-input address signal, and the resultantly-selected address signal is output to the game cassette 7 [see (a) and (c) provided in FIG. 3 (B)]. In contrast, in a case where the chip select signal is in a high state, the address signal, which has been previously input to the through-latch circuit 51, is latched, in its present form, and output to the game cassette 7 [see (b) and (d) provided in FIG. 3 (B)].

When a chip select signal and a read signal are input to the AND circuit 52, in a case where both the chip select signal and the read signal are in a low state, the AND circuit 52 outputs a read signal to the game cassette 7 [see (a) provided in FIG. 3 (A) and FIG. 3 (B)]. In contrast, in a case where either or both of the chip select signal and the read signal are in a high state, the AND circuit 52 outputs a read signal to the game cassette 7 [see (d) provided in FIG. 3(A) and FIG. 3(B)].

When a chip select signal and a read signal are input to the AND circuit 53, in a case where both the chip select signal and the read signal are in a low state, the AND circuit 53 outputs a read signal to the game cassette 7 [see (c) provided in FIG. 3 (A) and FIG. 3 (B)]. In contrast, in a case where either or both of the chip select signal and the read signal are in a high state, the AND circuit 53 outputs a read signal to the game cassette 7 [see (b) provided in FIG. 3 (A) and FIG. 3 (B)].

When the thus-produced read signal (i.e., the Q_read signal) or write signal (i.e., the Q_write signal) is input to the bi-directional buffer section 54, the read data buffer 54B that has received the read signal, or the write data buffer 54A that has received the write signal, within the bi-directional buffer section 54 becomes effective. A data signal which is read from the game cassette 7 on the basis of the address signal (the Q_address signal) is output from the game cassette 7, by way of the data read buffer 54B, and another data signal which is to be written into the game cassette 7 on the basis of the address signal (the Q_address signal) is input to the game cassette 7, by way of the data write buffer 54A.

FIG. 3(A) shows operation timings of the signals produced in a game machine not having the quiet control circuit 5 (i.e., signals produced in a conventional game machine). In the game machine which is not equipped with the quiet control circuit 5, unwanted garbage such as that designated by (b) shown in FIG. 3(A) arises. In contrast, in the game machine of the present invention equipped with the quiet control circuit 5, occurrence of unwanted garbage can be prevented, as designated by (b) shown in FIG. 3(B).

As shown in FIG. 4, the quiet control circuit 5, which acts as an access control circuit of the present invention, may be interposed between the CPU 1 and another circuit; that is, a circuit other than the CPU 1 (for example, cassette ROM provided within the game cassette 7 or the ROM 2 or RAM 3 provided within the game machine) In this case, when the CPU 1 accesses internal RAM 1A, the quiet control circuit 5 latches an address signal and outputs the thus-latched address signal to another circuit; that is, a circuit other than the CPU 1. Neither a read signal nor a write signal is output from the quiet control circuit 5. In FIG. 4, reference numeral 1B designates an I/O port.

(b) Description of a Second Embodiment

[Hardware Configuration of the Game Machine]

FIG. 5 is a block diagram showing the functional configuration of a portable game machine equipped with the power management system of the present invention. As shown in FIG. 5, the portable game machine of the present invention comprises a game drive circuit 101 for initiating a game; and a game control circuit 102 which issues a control signal for use in initiating a game (indicated by an arrow directed from the game control circuit 102 to the game drive circuit 101). Further, the portable game machine houses a high-power short-life drive battery (first power supply) 103 and a low-power long-life control battery (second power supply) 104. The drive battery 103 is typified by a manganese cell or an alkaline cell, and the control battery 104 is typified by a coin-type battery such as a mercury battery or a lithium battery.

As shown in FIG. 5, the game drive circuit 101 includes a drive circuit requiring comparatively large power, such as an LCD driver and a speaker driver. In a case where the game control circuit 102, such as a CPU and a clock, is fully activated, the drive battery 103 activates the game control circuit 102. Even when this is not the case, a weak current flows to required portions of the game control circuit 102.

The portable game machine equipped with the power management system of the present invention is characterized by comprising a power management circuit 105 to which are connected the game drive circuit 102, the game control circuit 102, the drive battery 103, and the control battery 104. By means of the power management circuit 105, power is supplied to both the game drive circuit 101 and the game control circuit 102 from the drive battery 103. The control battery 104 supplies only the minimum power sufficient to continue and maintain the operation of the game control circuit 102 but does not supply power in excess of the minimum required amount. Further, the control battery 104 does not supply any power to the game drive circuit 101.

As above, since the portable game machine equipped with the power management system of the present invention has the power management circuit 105, the game machine per se is not deactivated even if the control battery 104 is removed. In this sense, the drive battery 103 compensates for the game control circuit 102. However, if the drive battery 103 is removed, the game machine per se is deactivated.

As shown in FIG. 5, in the present embodiment, the power management circuit 105 is equipped with a power switch 106. The position of the power switch 106 will be described later in detail.

[Operation of the Game Machine]

As shown in FIG. 6, by means of the power management system of the present embodiment when the power switch 106 is pressed (S101), data are acquired (S102), and a determination is made as to whether or not the voltage of the drive battery 103 is greater than or equal to the minimum voltage (S103). If the voltage of the drive-battery 103 is greater than or equal to the minimum voltage, a further determination is made as to whether or not the voltage of the drive battery 103 is greater than or equal to a predetermined voltage (S104). If the voltage of the drive battery 103 is greater than or equal to the predetermined voltage, a determination is made as to whether or not the voltage of the control voltage 104 is greater than or equal to the predetermined voltage (S105).

In the power management system of the present embodiment, if in step 103 the voltage of the drive battery 103 is determined not to be greater than or equal to the minimum voltage, the power supply to the drive circuit 101 from the drive battery 103 is shut off (S108). In contrast, if the voltage of the drive battery 103 or the voltage of the control battery 104 is not greater than or equal to a predetermined voltage, alarm is activated to inform the player of that depletion of a battery is starting, thus prompting the player to prepare for battery replacement (S109 and S110).

In the present embodiment, the alarm is fulfilled by blinking of an LED. In order to enable the player to as certain whether the drive battery 103 or the control battery 104 is depleted, the, speed at which the LED blinks differs according to whether the power supply capability of the drive battery 103 is degraded or the power supply capability of the control battery 104 is degraded. Specifically, in the present embodiment, the LED blinks slowly in a case where the drive battery 103 is depleted (S109). In contrast, if the control battery 104 is depleted, the; LED blinks fast (S110).

In the power management system of the present embodiment, so long as in steps S104 and S105 the voltage of the drive battery, 103 is determined to be greater than or equal to the minimum voltage, the power supply to the drive circuit 101 from the drive battery 103 is not shut off on merely the ground that the voltages of the two batteries are lower than the predetermined voltage. Even when the voltages of the two batteries are lower than the predetermined voltage, processing proceeds to the following process, which would be followed when the voltages of the two batteries are greater than or equal to the predetermined voltage.

After a determination has been made as to whether or not the voltages of the two batteries are greater than or equal to a predetermined voltage, a determination is made as to whether or not the CPU is operating normally (S106). If the CPU is determined not to be operating normally, the power supply to the drive circuit 101 from the, drive battery 103 is shut off (S108).

If the CPU has been determined to be operating normally, processing returns to step S102, where acquisition of data is resumed, unless the power switch 106 is pressed. This control loop is iterated. However, if the power switch 106 is pressed, the power supply to the drive circuit 101 from the drive battery 103 is shut off, thereby terminating the game (S107).

In a case where the voltage of the drive battery 103 is greater than, or equal to the minimum voltage and the voltage of the drive battery, 103 is not greater than or equal to the predetermined value (S104), the LED constituting a portion of the control circuit 101 is caused to blink so as to activate the alarm, thus informing the player of depletion of the drive battery 103 and prompting the player to prepare for battery replacement (S108).

[Monitoring of Drive Battery]

FIG. 7 is a plot showing the electrical characteristic of a battery for the purpose of explaining the monitoring of the drive battery of the present invention. FIG. 7(A) is a plot schematically showing a time-varying change in the start-up voltage of the drive battery 103 (for example, an alkaline dry cell), and FIG. 7(B) is a plot schematically showing a time-varying change in the start-up voltage of the control battery 104 (for example, a lithium battery)

<Drive Battery>

In FIG. 7(A), the dry cell is stably and normally operated until t1 and is temporarily shut off during a period of t1 to t2. However, the dry cell is depleted after t3, and the voltage of the dry cell drops thereafter.

Provided that the battery has the electrical characteristic of a lithium dry cell such as that shown in FIG. 7 and that a minimum required voltage for activating the CPU normally (i.e., the minimum voltage for preventing the CPU from performing faulty operations) is E0 as shown in FIG. 7(A), in the first phase the power management system of the present invention determines whether the voltage of the drive battery 103 is greater than or equal to the minimum voltage E0 (in step S103, which has been described previously). If the voltage of the drive battery 103 is lower than the minimum voltage E0, a game is terminated (in step S108, which has been described previously).

In a case where the drive battery 103 is not originally housed in the game machine and is incapable of supplying the minimum voltage E0 or where the drive battery 103 is abruptly removed during the course of a game, to thereby induce a sharp drop in the voltage of the drive battery 103, as well as in a case where the drive battery 103 is depleted and becomes unable to supply the minimum voltage E0 required by the CPU 1, the power supply to the drive battery 103 is shut off according to the above-described control routine.

In the event of a drop arising in the voltage of a battery to E1, depletion of the battery begins, and alarm is activated to inform the player of a drop in the voltage of the battery to E0 in the near future, as has been described previously (in step S109).

<Control Battery>

FIG. 7(B) shows that the lithium battery stably and normally operates by t4 and is depleted and drops after t4 (where t4 is longer in duration than t3).

Provided that the battery has the electrical characteristic of a lithium dry cell such as that shown in FIG. 7(B) and that a minimum required voltage for activating the CPU normally (i.e., the minimum voltage for preventing faulty operations of the CPU) is E0 as shown in FIG. 7(A), if the voltage of the lithium battery drops to E2 after the.voltage of the drive battery 103 has been monitored (in steps S103 and S104, which have been described previously), the power management system of the present invention activates the alarm, to thereby inform the player that depletion of the lithium battery has begun (in step S110, which has been described previously). In contrast with depletion of the drive battery 103, even if the lithium battery is depleted, neither the power supply from the lithium battery nor the power supply from a dry cell is shut off.

In the present embodiment, if the voltage of a dry cell drops to predetermined voltage E1 or the voltage of a lithium battery drops to predetermined value E2, the alarm is activated by causing an LED to blink (in steps S109 and S110, which have been described previously) At this time, the value of E1 and the value of E2 are determined, as required, in consideration of the characteristics of the dry cell and the lithium battery.

[Operation of the Game Machine When a Game is Terminated]

In the portable game machine of the present invention, in a case where a shut-down signal is issued when the game is terminated (in step S107, which has been described previously), as shown in FIG. 8 the entirety of the liquid crystal screen is made white, (S202) instead of the power supply being shut off abruptly. After a determination has been made as to whether or not the CPU has completed processing to a good point for leaving off and whether or not the power of the game machine can be turned off safely (S203), the power of the game machine is turned off (S204).

As mentioned above, so long as the power of the game machine is not abruptly shut off and the power supply to the CPU from the drive, battery 103 is shut off after the CPU has completed processing to a good point for leaving off, the power of the game machine can be turned off without imposing a burden on the CPU, thereby diminishing the chance of breakdown of the CPU.

Further, so long as the power of the game machine is shut off after a screen appearing after shut-off of power supply has been rendered, a game is completed without involving transient occurrence of an unfavorable screen or unfavorable impression, which would be transiently induced during the course of shutting off of the game machine, thus leaving uncluttered impression after termination of the game (i.e., the player's feeling after the end of a game).

In a case where the liquid crystal screen is of normally-white type, an expression "formation of a screen after shutoff of power supply" corresponds to shutoff of the game machine after the entire liquid crystal screen has been made white. The entire liquid crystal screen is made white by means of an operation for making a palette white or an operation for indicating a white character on the entire screen.

[Specific Configuration of a Power Management Circuit]

FIG. 9 shows one example of specific configuration of the power management circuit. As shown in FIG. 9, the power management circuit of the present embodiment is connected to a Non-Maskable Interrupt (NMI) terminal of the CPU. The game machine is shut off or activated at a trailing edge of the NMI signal.

The power switch 106 electrically connects line L1 to line L2. A pressed state of the power switch 106 corresponds to a state in which lines L1 and L2 are electrically connected together.

In a case where a drive battery MBT is housed in the game machine and has a sufficient start-up voltage, a sufficient voltage is applied to the base of a transistor 111 by way of line L5, thereby turning on the transistor 111.

If the power switch 106 is pressed while the transistor 111 is in an ON state, an NMI, signal drains to the outside by way of lines L1, L2, L4 and the transistor 111. If the power switch 106 is pressed while the transistor 111 is in an ON state, the NMI signal is shifted from a high state to a low state, thus turning the game machine, off.

If the power switch 106 is pressed again in this state, the NMI signal drains to the outside by way of the same channel and is shifted from a high state to a low state, thus turning the game machine off.

In the power management circuit of the present embodiment, both a lithium battery LBT and the dry cell MBT are connected to each of the game control circuit and the game drive circuit. Here, the dry cell MBT is connected to the game control circuit by way of a booster circuit 113. Hence, in a state in which the dry cell. MBT of normal Voltage is housed in the game machine, electric discharge of the lithium battery LBT is prevented, and power is supplied to the game drive circuit and the game control circuit.

The game control circuit is connected both to the lithium battery LBT and the dry cell MBT upstream of an FET 114, whereas the game drive circuit is connected to both the lithium battery LBT and the dry cell MBT downstream of the FET 114. Accordingly , if the FET 114 is turned off, power is supplied to the game control circuit from the lithium battery LBT or from the dry cell MBT. In contrast, power supply to the game drive circuit is shut off.

In the power management circuit of the present embodiment having the above-described configuration, in a case where the dry cell MBT of normal voltage is stored in the game machine and where the FET 114 is in an open state, power is supplied to both the game drive circuit and the game control circuit, and a capacitor 115 is recharged.

In the event of abrupt removal of the dry cell MBT, application of a voltage to the base of the transistor 111 is lost, whereupon the transistor 111 is turned off. Meanwhile, the capacitor 15 causes electric discharge, and the thus-discharged voltage is applied to the gate of an FET 112 by way of lines L3, L4, L6, and L7, thereby turning the FET 112 on. At this time, the NMI signal drains to the outside by way of line L1, line L8, and the FET 112 and is shifted from a high state to a low state. As a result, an FET 114 is turned off, thereby shutting off the power supply to the game drive circuit.

The game control circuit is positioned upstream of the FET 114, and hence power is supplied to the game control circuit from the lithium battery LBT even after the FET 114 has been turned off. Accordingly, even if the drive battery MBT is abruptly removed while the game machine is in an ON state, the power supply to the game drive circuit is shut off while the power supply to the game control circuit is maintained.

In a case where a drop arises in the voltage of the dry cell MBT, the application of the voltage to the base of the transistor 111 is degraded. When the transistor 111 is turned off, the voltage of the lithium battery LBT is applied to the gate of the FET 112 b way of lines L3, L4, L6, and L7 in the same manner as has been described previously. Accordingly, the FET 112 is turned on, thereby shutting off the power supply to the game drive circuit.

Even an attempt is made to press the power switch 106 again while the drive battery MBT is removed from the game machine, the NMI signal cannot pass through the transistor 111 or contribute to activation/deactivation of the FET 112. Thus, however hard the player presses the power switch 106 while the drive battery.:MBT is removed from the game machine, the game machine remains deactivated.

Likewise, even in a case where the drive battery MBT is not provided in the game machine from the beginning, the NMI signal cannot pass through the transistor 111 and cannot contribute to activation/deactivation of the FET 112. Accordingly, however hard the player presses the power switch 106 while the drive battery MBT is not provided in the game machine, the game machine remains deactivated.

As has been described, in a case where the game machine employs a power management circuit such as that shown in FIG. 9, use of power of the control battery LBT for activating the game machine is prevented, thereby preventing wastage of power of the control battery LBT.

A specific configuration of the power management circuit is not limited to that mentioned previously; any type of circuit can be employed so long as it enables the object of the present invention to be achieved.

Power management may be effected in accordance with a program stored in a storage medium. In such a case, there may be used a storage medium in which there is stored a program to be used for fulfilling the operation flow provided in FIG. 6 or FIG. 8.

[Partial Shut-Off of Power Supply Within the Game Machine].

FIG. 10 shows one example of an operation flow to be used for partially shutting off power supply within the portable game machine in accordance with degradation (due to, for example, power dissipation) of power supply capability of a portable battery (in principle, a dry cell).

As shown in FIG. 10, at the time of fulfillment of power management, after data have been acquired (S301), a determination is made as to whether or not the voltage of the drive battery 103 is sufficient to supply power to all the circuits incorporated in the portable game machine (S302). If the voltage of the drive battery 103 is determined to be insufficient, priorities, which have been assigned to the circuits and stored in a storage medium, are retrieved (S303). When a highest-priority circuit is picked up, a determination is made as to whether or not the thus-picked up circuit has already been taken as an object of power shutoff (S304). If the highest-priority circuit has not yet been taken as an object of power shutoff, the power supply to the circuit is shut off (S306).

In contrast, if the highest-priority circuit has already been taken as an object of power shutoff, a second-highest-priority circuit is retrieved (S305), and retrieval of a circuit is iterated until a circuit which has not yet been taken as an object of power shutoff is found.

The foregoing power management can be readily fulfilled through use of a storage medium on which is stored a program to be used for fulfilling the operation flow shown in FIG. 10.

What is claimed is:

1. A portable game machine comprising:

a game machine housing;

a game drive circuit for activating a game;

a game control circuit for issuing a control signal for activating a game;

a high-power short-life first power supply serving as a battery for activating the game drive circuit and the game control circuit; and a low-power long-life second power supply serving as a battery for activating the game drive circuit and the game control circuit, the game machine housing being configured to prevent access to the second power supply without the use of a tool;

the portable game machine further comprising:

a power switch for turning on or off power supply to the game drive circuit from the first power supply; and a power management system for controlling a power supply channel from the first power supply and a power supply channel from the second power supply, the power management system having the function of performing control operation (I) indispensably and at least one control operation selected from the group consisting of (ii), (iii), (iv), and (v):

(i) an operation for, in principle, supplying power to the game drive circuit from the first power supply, as well as for supplying power to the game control circuit from the first power supply when the first power supply has sufficient power supply ability and supplementally supplying power from the second power supply;

(ii) an operation for supplying power to the game control circuit from the first power supply, when it is detected that the power supply capability of the second power supply has dropped to a predetermined level or lower;

(iii) an operation for preventing power supply to the game control circuit from the second power supply even though the power switch is turned on, when it is detected that the power supply capability of the first power supply has dropped to a predetermined level or lower;

(iv) an operation for preventing power supply to the game drive circuit from the first power supply without involvement of power supply to the game control circuit from the second power supply when it is detected that the power supply capability of the first power supply has dropped to a predetermined level or lower, as well as for preventing power supply to the game control circuit from the second power supply even though the power switch is turned on; and (v) an operation for supplying power supply to the game drive circuit from the first power supply when runaway of a control circuit provided within circuitry is detected.

2. The portable game machine as defined in claim 1, further comprising the following device or functions solely or in combination:

(i) a battery depletion indicator which indicates a drop in the power supply capability of the first power supply and/or a drop in the power supply capability of the second power supply and whose indication differs according to whether a drop in the power supply capability of the first power supply is indicated or a drop in the power supply capability of the second power supply is indicated;

(ii) a clear-off function of shutting off power supply to a game drive circuit from the first power supply after formation of a screen appearing after shut-off of power; and (iii) a shut-off function for shutting off a control mechanism pertaining to control of the game control circuit with reference to the processing required until the game has reached a good point in time for leaving off, in terms of game control.

3. The portable game machine of claim 1, wherein the power management system is configured to perform control operation (iii).

4. The portable game machine of claim 1, wherein the power management system is configured to shut off power supply in an ascending sequence of priority in accordance with pre-set priority levels when it is detected that the power supply capability of the first power supply is lower than a predetermined level.

5. A computer-readable storage medium having stored therein a program for shutting off power supply in ascending sequence of priority from a low priority level in accordance with pre-set priority levels when, as defined in claim 4, it is detected that the power supply capability of the first power supply is lower than a predetermined level.

6. A computer-readable storage medium on which the priority levels described in claim 4 are recorded.

7. A portable game machine comprising:

a game drive circuit for activating a game;

a game control circuit for issuing a control signal for activating a game;

a high-power short-life first power supply serving as a battery for activating the game drive circuit and the game control circuit; and a low-power long-life second power supply serving as a battery for activating the game drive circuit and the game control circuit, the portable game machine comprising the following device or functions solely or in combination:

(i) a battery depletion indicator which indicates a drop in the power supply capability of the first power supply and/or a drop in the power supply capability of the second power supply and whose indication differs according to whether a drop in the power supply capability of the first power supply is indicated or a drop in the power supply capability of the second power supply is indicated;

(ii) a clear-off function of shutting off power supply to a game drive circuit from the first power supply after formation of a screen appearing after shut-off of power; and (iii) a shut-off function for shutting off a control mechanism pertaining to control of the game control circuit with reference to the processing required until the game has reached a good point in time for leaving off, in terms of game control.

8. The portable game machine as defined in claim 7, wherein the battery depletion indicator provides indication through blinking of a lamp.

9. The portable game machine as defined in claim 8, wherein the speed at which the lamp blinks differs according to whether the power supply capability of the first power supply has dropped or the power supply capability of the second power supply has dropped.

10. The portable game machine as defined in claim 7, wherein the game screen is a liquid crystal display screen, and power supply to the game drive circuit from the first power supply is shut off after the entire game screen has been rendered white or black.

11. A portable game machine comprising:

a game drive circuit for activating a game;

a game control circuit for issuing a control signal for activating a game;

a high-power short-life first power supply serving as a battery for activating the game drive circuit and the game control circuit;

a low-power long-life second power supply serving as a battery for activating the game drive circuit and the game control circuit, the game machine housing being configured to prevent access to the second power supply without the use of a tool; and a power management system for controlling a power supply channel from the first power supply and a power supply channel from the second power supply, the power management system being configured to supply power to the game control circuit from the first power supply, when it is detected that the power supply capability of the second power supply has dropped to a predetermined level or lower.

12. A portable game machine comprising:

a game drive circuit for activating a game;

a game control circuit for issuing a control signal for activating a game;

a high-power short-life first power supply serving as a battery for activating the game drive circuit and the game control circuit;

a low-power long-life second power supply serving as a battery for activating the game drive circuit and the game control circuit, the game machine housing being configured to prevent access to the second power supply without the use of a tool; and a power management system for controlling a power supply channel from the first power supply and a power supply channel from the second power supply, the power management system being configured to supply power to the game drive circuit from the first power supply when runaway of a control circuit provided within circuitry is detected.

* * * * *